(12) United States Patent
Depondt (10) Patent No.: US 9,616,855 B2
(45) Date of Patent: Apr. 11, 2017

(54) WIPER BLADE ADAPTER, IN PARTICULAR FOR A MOTOR VEHICLE WIPER DEVICE

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 771 days.

(21) Appl. No.: 13/976,948

(22) PCT Filed: Nov. 22, 2011

(86) PCT No.: PCT/EP2011/070681
§ 371 (c)(1),
(2), (4) Date: Sep. 3, 2013

(87) PCT Pub. No.: WO2012/089415
PCT Pub. Date: Jul. 5, 2012

(65) Prior Publication Data
US 2013/0343811 A1  Dec. 26, 2013

(30) Foreign Application Priority Data
Dec. 27, 2010  (DE) .......... 10 2010 064 161

(51) Int. Cl.
*B60S 1/40* (2006.01)
*B60S 1/38* (2006.01)

(52) U.S. Cl.
CPC ............ *B60S 1/40* (2013.01); *B60S 1/387* (2013.01); *B60S 1/4003* (2013.01); *B60S 1/407* (2013.01); *B60S 1/4009* (2013.01); *B60S 1/4077* (2013.01); *B60S 1/4087* (2013.01); *B60S 2001/4022* (2013.01); *B60S 2001/4035* (2013.01); *B60S 2001/4051* (2013.01); *B60S 2001/4058* (2013.01); *Y10T 403/602* (2015.01)

(58) Field of Classification Search
CPC ........ B60S 1/40; B60S 1/4003; B60S 1/4009; B60S 1/4045; B60S 1/4083; B60S 1/4077; B60S 2001/4022; B60S 2001/4035; B60S 2001/4058; B60S 2001/4061; B60S 1/387
USPC ..................................... 15/250.32
See application file for complete search history.

(56) References Cited

U.S. PATENT DOCUMENTS

2010/0205763 A1  8/2010  Ku
2010/0257687 A1  10/2010  Huang

FOREIGN PATENT DOCUMENTS

| CN | 101879888 | 11/2010 |
|---|---|---|
| DE | 202009013452 | 1/2010 |
| DE | 102009002764 | 11/2010 |
| EP | 1995130 | 11/2008 |
| RU | 2293034 C2 | 2/2007 |
| WO | 2009/133979 | 11/2009 |

OTHER PUBLICATIONS

International Search Report for Application No. PCT/EP2011/070681 dated Mar. 5, 2012 (3 pages).

*Primary Examiner* — Gary Graham
(74) *Attorney, Agent, or Firm* — Michael Best & Friedrich LLP (57) ABSTRACT

The invention is based on a wiper blade adapter, in particular for a motor vehicle wiper device, with a coupling unit (10*a*; 10*b*). It is proposed that the coupling unit (10*a*; 10*b*) has at least one first and one second coupling element (12*a*, 14*a*; 12*b*, 14*b*), which coupling elements are provided for coupling at least two different types of wiper arm adapters (100*a*, 110*a*, 120*a*; 130*b*, 140*b*).

12 Claims, 13 Drawing Sheets

WIPER BLADE ADAPTER, IN PARTICULAR FOR A MOTOR VEHICLE WIPER DEVICE

BACKGROUND OF THE INVENTION

Wiper blade adapters comprising a coupling unit are already known from the motor vehicle wiper device sector. The coupling unit is provided for coupling to a wiper arm adapter which is arranged on a motor-driven wiper arm.

SUMMARY OF THE INVENTION

The invention is based on a wiper blade adapter, in particular for a motor vehicle wiper device, comprising a coupling unit.

It is proposed that the coupling unit has at least one first and one second coupling element, which are provided for coupling at least two different types of wiper arm adapters, thus enabling particularly flexible use of the wiper blade adapter to be obtained. A "coupling unit" in this context is to be understood as meaning, in particular, a unit which is provided for coupling a wiper blade to a wiper arm. A "coupling element" in this context is to be understood as meaning, in particular, an element which is provided for providing a coupling region for coupling a wiper arm adapter. "Coupling" in this context is to be understood as meaning, in particular, a frictional and/or form-fitting connection. "Different types of wiper arm adapters" in this context are to be understood as meaning, in particular, different wiper arm adapter systems which differ in the design thereof and/or in the fastening function thereof. Variously standardized wiper arm adapter systems are preferred. A first type of a wiper arm adapter in this context is to be understood as meaning, in particular, a wiper arm adapter which has a fastening pin and a supporting plate. A further possible type of a wiper arm adapter in this context is to be understood as meaning, in particular, a wiper arm adapter which has an elongate, hook-shaped basic body having a curvature of 180°. A further possible type of a wiper arm adapter in this context is to be understood as meaning, in particular, a wiper arm adapter which has two return stops and a fastening lug. A further possible type of a wiper arm adapter in this context is to be understood as meaning, in particular, a wiper arm adapter which has a fastening recess and a basic body with an S-shaped profile. A further possible type of a wiper arm adapter in this context is to be understood as meaning, in particular, a wiper arm adapter which has a fastening recess and walls with fastening means. "Provided" is to be understood as meaning, in particular, specially designed and/or equipped. A "wiper arm adapter" in this context is to be understood as meaning, in particular, an adapter which is provided for providing a coupling region of the wiper arm for coupling to the wiper blade adapter.

Furthermore, it is proposed that the first and second coupling elements are formed by separate components, thus enabling the wiper blade adapter to be adapted in a particularly simple manner for coupling to different types of wiper arm adapters. "Separate components" in this context are to be understood as meaning, in particular, components which are mutually free of material bonds.

If the first and second coupling elements are designed so as to be detachable from each other, the wiper blade adapter can be adapted in a particularly simple manner for coupling to different types of wiper arm adapters. "Detachable" in this context is to be understood as meaning, in particular, "non-destructively separable". The wiper blade adapter is particularly advantageously detachable and/or fastenable without a tool.

If the wiper device has a latching unit which is provided for connecting the first coupling element to the second coupling element via a latching connection, the first and second coupling elements can be connected particularly rapidly and reliably. A "latching unit" in this context is to be understood as meaning, in particular, a unit which is provided for producing a latching connection between two components.

In a further refinement of the invention, it is proposed that at least one of the coupling elements has at least one longitudinal guide element which is provided for guiding a wiper arm during installation, thus enabling the wiper blade adapter to be securely coupled to a wiper arm. A "longitudinal guide element" in this context is to be understood as meaning, in particular, an element which is provided for guiding a component in a longitudinal direction. A "longitudinal direction" in this context is to be understood as meaning, in particular, a direction which runs parallel to a main longitudinal extent of an element. A "main longitudinal extent" in this context is to be understood as meaning, in particular, a greatest possible extent. An "extent" of an element in this context is to be understood as meaning, in particular, a maximum distance between two points of a perpendicular projection of the element onto a plane.

Furthermore, it is proposed that at least one of the coupling elements has at least one latching means which is provided for limiting the freedom of movement of a wiper arm adapter in a fitted state, thus enabling simple and rapid coupling to a wiper arm adapter to be achieved. A "latching means" in this context is to be understood as meaning, in particular, a spring-elastic means for producing a latching connection, said means being provided so as to be elastically deflected during installation.

If the wiper blade adapter comprises an enclosure means which is provided for closing off at least part of a coupling element to the outside, the wiper blade adapter and/or a wiper arm adapter can be particularly readily protected from damage and/or corrosion. An "enclosure means" in this context is to be understood as meaning, in particular, a means which, in at least one fitted state, forms a substantially visible outer surface and provides a receiving region for the wiper arm adapter unit. "Substantially visible" in this context is to be understood as meaning, in particular, discernible at a glance. The enclosure means preferably at least partially encloses other components.

Furthermore, it is proposed that the wiper blade adapter has an enclosure means which is provided for limiting the freedom of movement of a wiper arm adapter, thus enabling an advantageous extension of the possibilities of using the wiper blade adapter.

If at least one enclosure means is mounted movably, a wiper arm adapter can be secured in a particularly simple manner. "Mounted" in this context is to be understood as meaning, in particular, captively connected.

BRIEF DESCRIPTION OF THE DRAWINGS

Further advantages emerge from the description below of the drawing. The drawing illustrates two exemplary embodiments of the invention. The drawings, the description and the claims contain numerous features in combination. A person skilled in the art will expediently also consider the features individually and combine them to provide expedient further combinations.

In the drawings.

DETAILED DESCRIPTION

Figure 1:
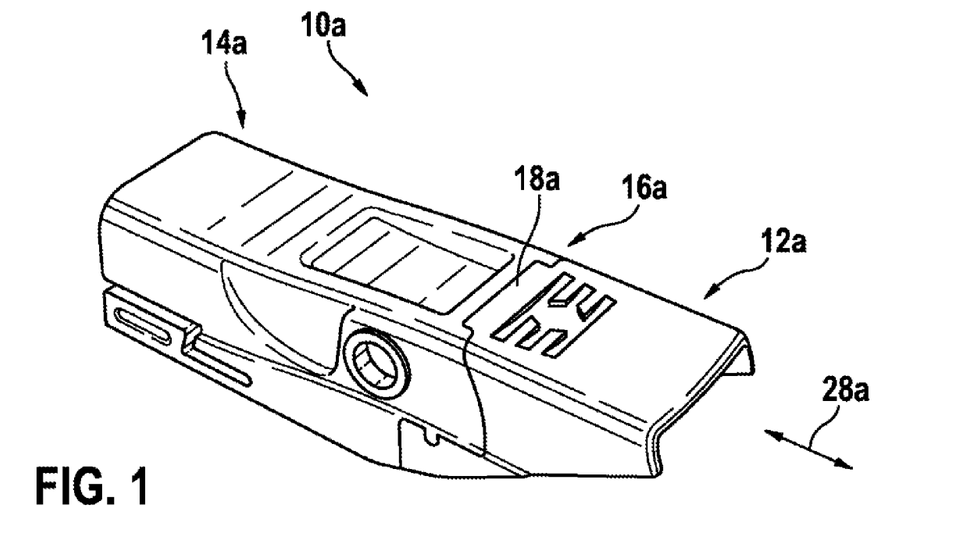
FIG. 1 shows a perspective view of a wiper blade adapter according to the invention.

FIG. 1 shows a wiper blade adapter according to the invention comprising a coupling unit 10a which has a first coupling element 12a and a second coupling element 14a. The first coupling element 12a and the second coupling element 14a are formed by separate components. The coupling elements 12a, 14a are connected in a form-fitting manner.

Figure 2:
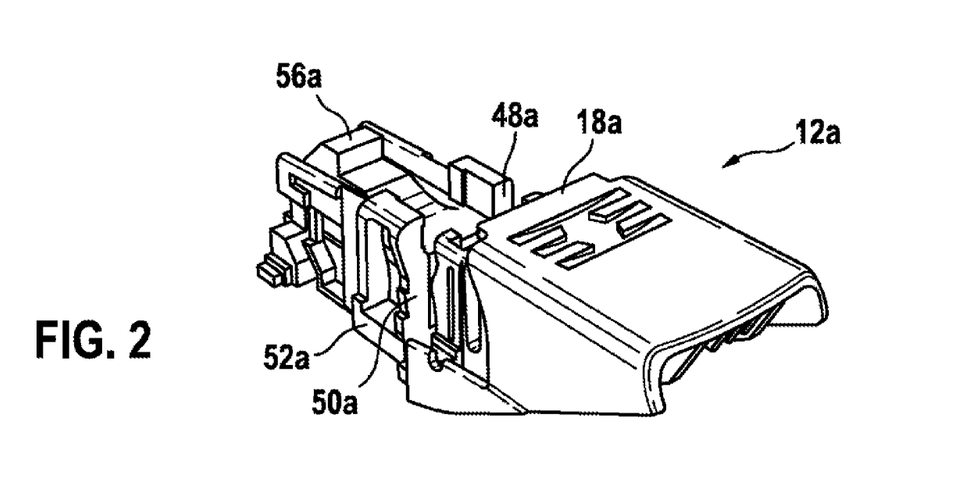
FIG. 2 shows a perspective view of a first coupling element of the wiper blade adapter according to FIG. 1.

The wiper blade adapter contains a latching unit 16a which is provided for connecting the first coupling element 12a to the second coupling element 14a via a latching connection. For this purpose, the first coupling element 12a comprises a latching means 18a which is arranged at a free end of the first coupling element 12a. The latching means 18a is deflectable in a spring-elastic manner out of a starting position and, after a deflection, automatically moves back into the starting position. The first and second coupling elements 12a, 14a are designed so as to be detachable, i.e. non-destructively separable, from each other by means of the latching unit 16a. In the fitted state shown, the latching means 18a forms a form-fitting connection with the second coupling element 14a.

Figures 3, 4:
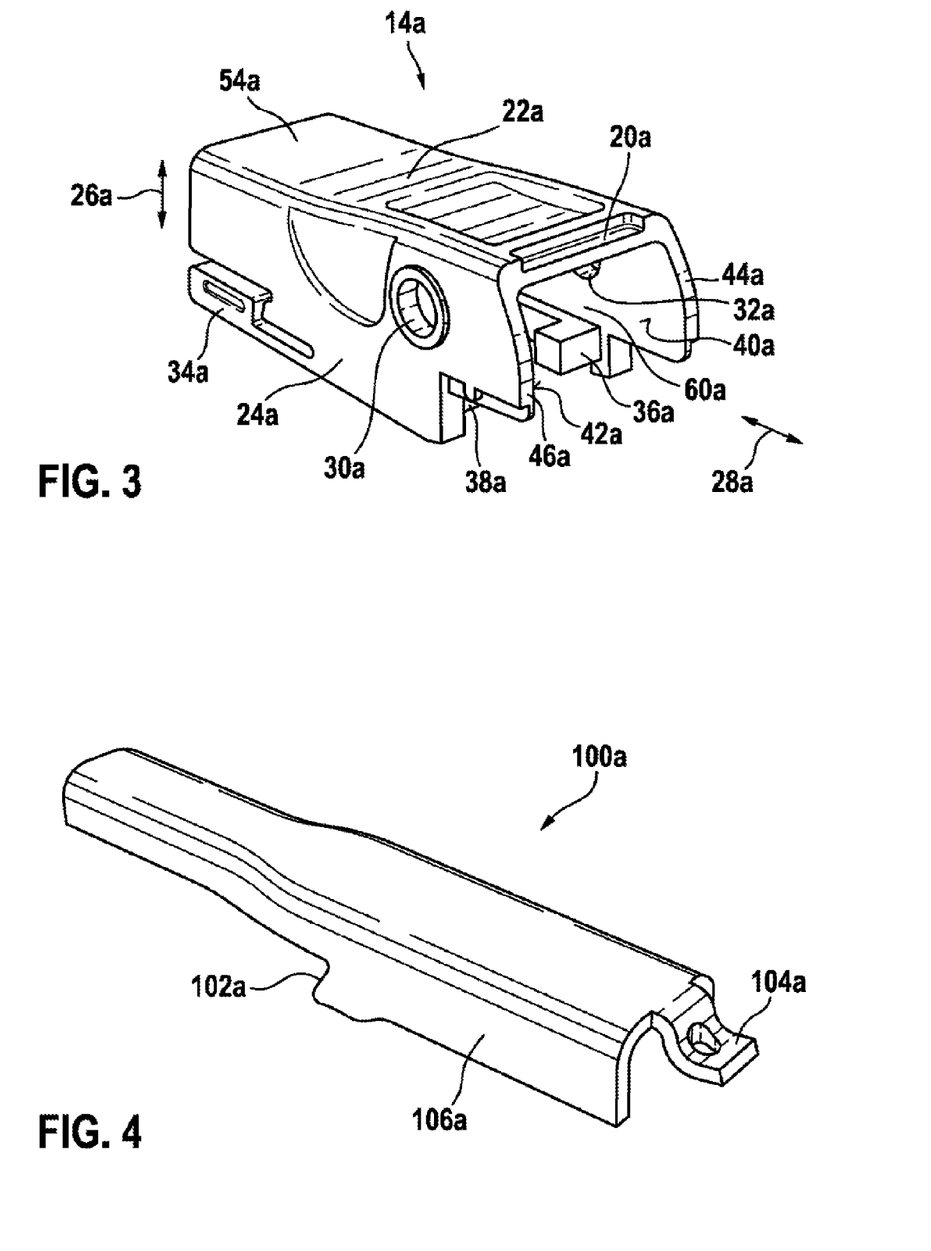
FIG. 3 shows a perspective view of a second coupling element of the wiper blade adapter according to FIG. 1.
FIG. 4 shows a perspective view of one type of a wiper arm adapter.

In this case, the latching means 18a engages in a latching recess 20a of the second coupling element 14a (FIG. 3). The latching recess 20a is arranged in a covering 22a of the coupling element 14a. The covering 22a is formed in one piece with a basic body 24a of the second coupling element 14a and closes said basic body off in a vertical direction 26a. "In one piece" is to be understood as meaning, in particular, integrally bonded, as, for example, by a welding process and/or adhesive-bonding process, etc., and, particularly advantageously, integrally formed, as by monobloc production and/or production by injection molding using one or more components. The vertical direction 26a extends perpendicularly to a longitudinal direction 28a, which runs parallel to a main longitudinal extent of the second coupling element 14a.

The second coupling element 14a has two circular fastening recesses 30a, 32a which are arranged in the basic body 24a. The fastening recesses 30a, 32a are provided for a form-fitting connection to a wiper arm adapter. Furthermore, the second coupling element 14a comprises a latching means 34a which is arranged at a free end of the basic body 24a. Two vertical guide elements 36a, 38a of the second coupling element 14a are integrally formed on the basic body 24a. The vertical guide elements 36a, 38a are adjacent to inner surfaces 40a, 42a of side walls 44a, 46a of the second coupling element 14a. The side walls 44a, 46a are formed in one piece with the covering 22a and, together with the latter, form an enclosure means 54a. The enclosure means 54a closes off part of the second coupling element 14a to the outside. The enclosure means 54a here forms a longitudinal guide element 60a of the second coupling element 14a, which is provided for guiding a wiper arm during installation.

To receive the vertical guide elements 36a, 38a, the first coupling element 12a has two vertical guide rails 48a, 50a which are formed by a basic body 52a. To produce a latching connection between the first coupling element 12a and the second coupling element 14a, the second coupling element 14a is placed in the vertical direction 26a onto the first coupling element 12a. In the process, the vertical guide elements 36a, 38a engage in the vertical guide rails 48a, 50a and avoid a movement of the first coupling element 12a relative to the second coupling element 14a in any direction deviating from the vertical direction 26a. By the first coupling element 12a being pushed onto the second coupling element 14a, the latching means 18a is deflected in the longitudinal direction 28a. In an end position, the latching means 18a latches back and forms a form-fitting connection with the latching recess 20a. A movement of the first coupling element 12a relative to the second coupling element 14a in the vertical direction 26a is therefore avoided. To release the latching connection, the latching means 18a is deflected and the second coupling element 14a is pushed out of the vertical guide rails 48a, 50a.

During a coupling of the wiper blade adapter to a wiper arm adapter, the second coupling element 14a has to be removed or placed thereon, depending on a type of the wiper arm adapter.

The first coupling element 12a has a further latching means 56a for coupling a wiper arm adapter of a further type. The latching means 56a is arranged on the basic body 52a and is connected in one piece thereto. During a coupling of a corresponding wiper arm adapter, the latching means 56a is deflected in the vertical direction 26a out of a starting position and finally moves back again into the latter.

FIG. 4 shows a perspective view of a wiper arm adapter 100a which is provided for coupling to the wiper blade adapter. The wiper arm adapter 100a has two return stops 102a and a fastening lug 104a. The return stops 102a end flush with side walls 106a of the wiper arm adapter 100a. The fastening lug 104a is designed as an extension at a free end of the wiper arm adapter 100a.

Figure 5A:
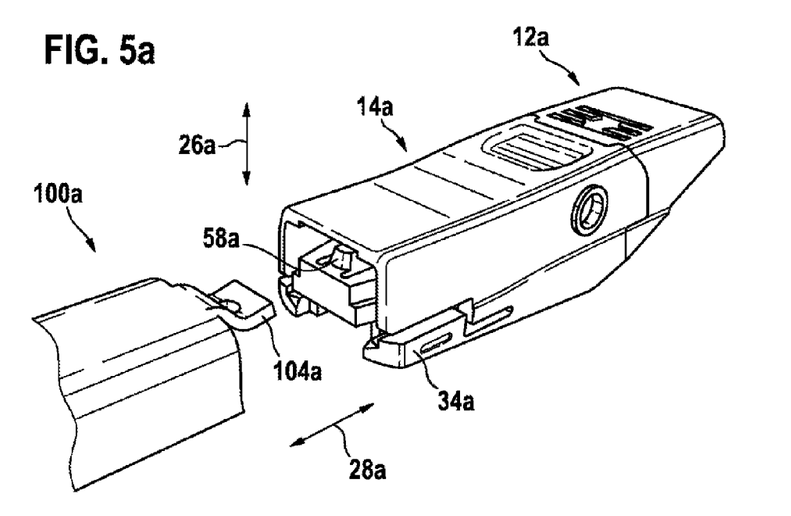
FIGS. 5a to 5d show a perspective view of the wiper blade adapter according to FIG. 1 and of the wiper arm adapter according to FIG. 4 during an installation sequence.

FIG. 5a shows a perspective view of a first installation step of a coupling of the wiper arm adapter 100a to the wiper blade adapter. As viewed in the longitudinal direction 28a, the wiper arm adapter 100a is arranged in front of the wiper blade adapter. The fastening lug 104a is pushed over a latching means 58a of the first coupling element 12a. The latching means 58a is of barb-shaped design and is deflected in the vertical direction 26a by the fastening lug 104a. In the process, the latching means 58a of the first coupling element 12a presses onto the latching means 34a of the second coupling element 14a and deflects the latter likewise in the vertical direction 26a.

Figure 5B:
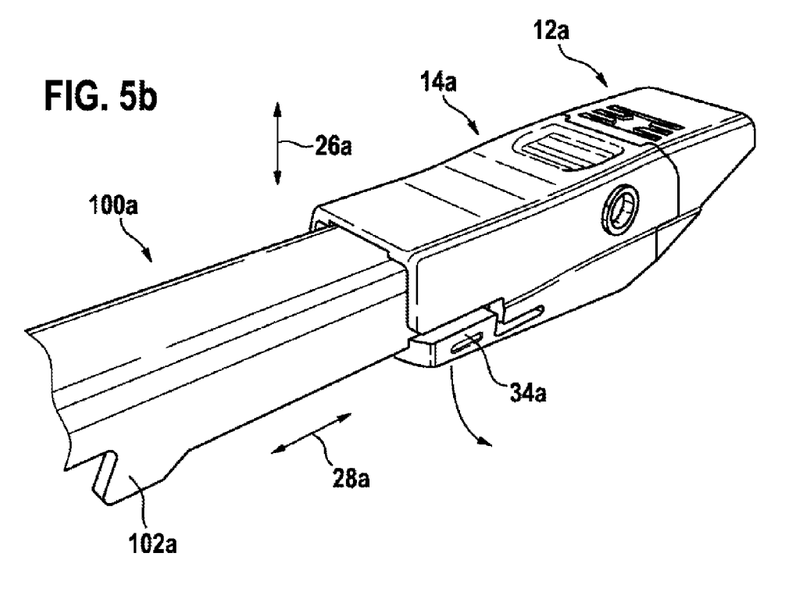
Figure 5C:
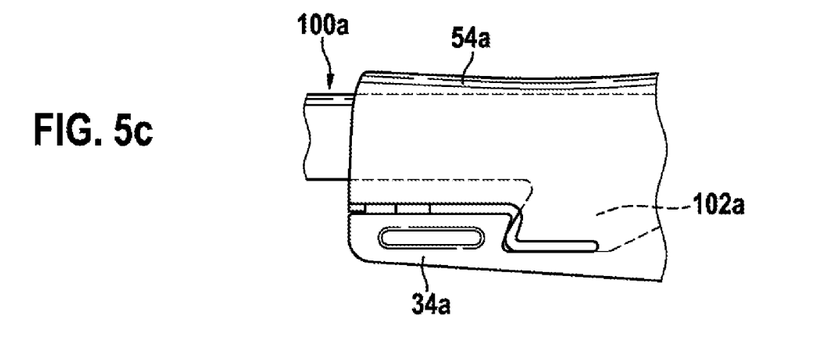
Figure 5D:
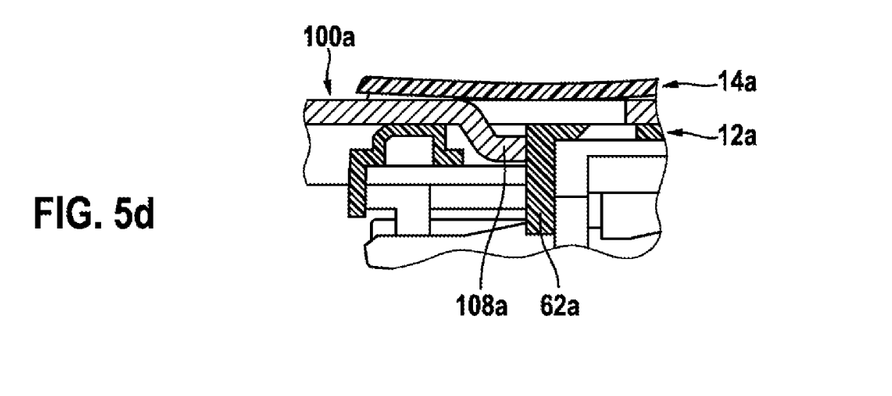

The wiper arm adapter 100a is then pushed into the enclosure means 54a and guided by the longitudinal guide element 60a of the second coupling element 14a (FIG. 5b). Finally, the latching means 34a of the second coupling element 14a is deflected in the vertical direction 26a out of the starting position thereof by the return stops 102a. If the wiper arm adapter 100a is pushed entirely into the enclosure means 54a, the latching means 34a springs back into the starting position thereof and avoids pushing the wiper arm adapter 100a back out of the fitted state (FIG. 5c). As a result, the freedom of movement of the wiper arm adapter 100a in the fitted state is limited. In a variant of the wiper arm adapter 100a, the latter has a second fastening lug 108a which, in a fitted state, is adjacent to a stop 62a of the first coupling element 12a (FIG. 5d).

Figure 6:
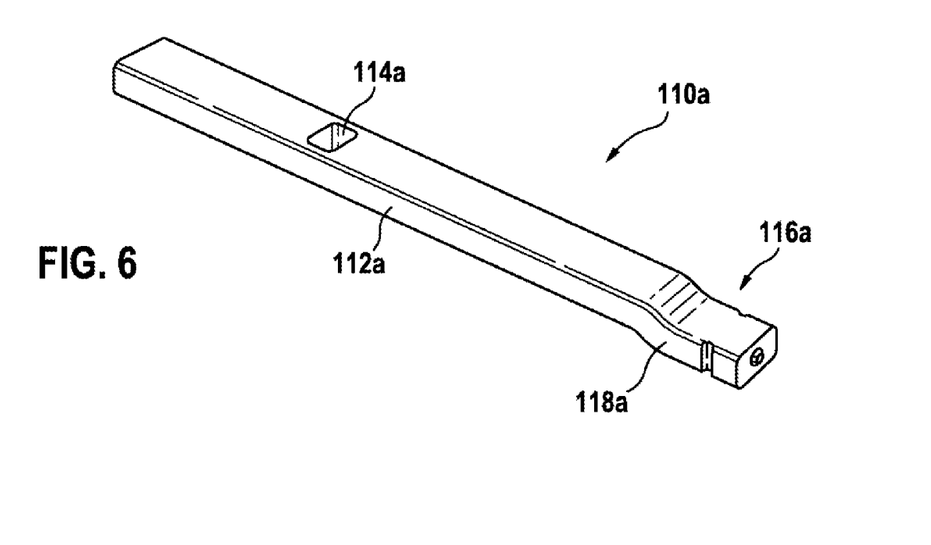
FIG. 6 shows a perspective view of a further type of a wiper arm adapter.

FIG. 6 shows a wiper arm adapter 110a which differs in terms of type from the wiper arm adapter 100a from FIG. 4. The wiper arm adapter 110a has a basic body 112a with a fastening recess 114a. In an end region 116a, the wiper arm adapter 100a has an S-shaped profile 118a.

Figure 7A:
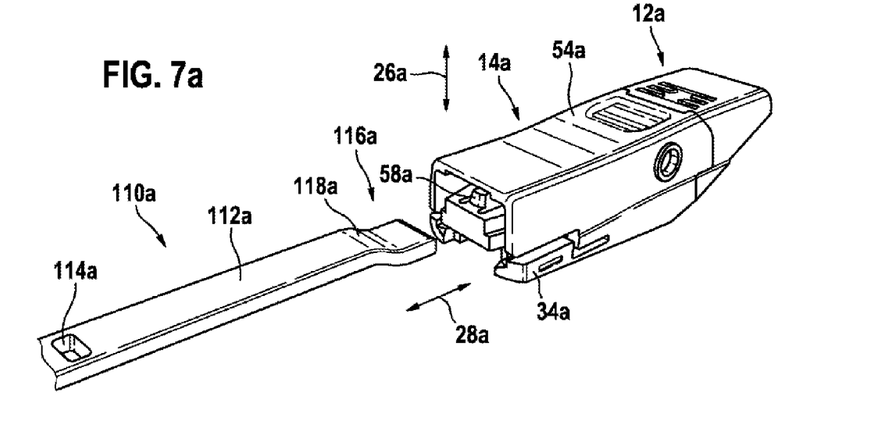
FIGS. 7a and 7b show a perspective view of the wiper blade adapter according to FIG. 1 and of the wiper arm adapter according to FIG. 6 during an installation sequence.

FIG. 7a shows a perspective view of a first installation step of a coupling of the wiper arm adapter 110a to the wiper blade adapter. As viewed in the longitudinal direction 28a, the wiper arm adapter 110a is arranged in front of the wiper blade adapter. The basic body 112a is pushed over the latching means 58a of the first coupling element 12a. The latching means 58a is of barb-shaped design and is deflected in the vertical direction 26a by the basic body 112a. In the process, the latching means 58a of the first coupling element 12a presses onto the latching means 34a of the second coupling element 14a and deflects the latter likewise in the vertical direction 26a.

Figure 7B:
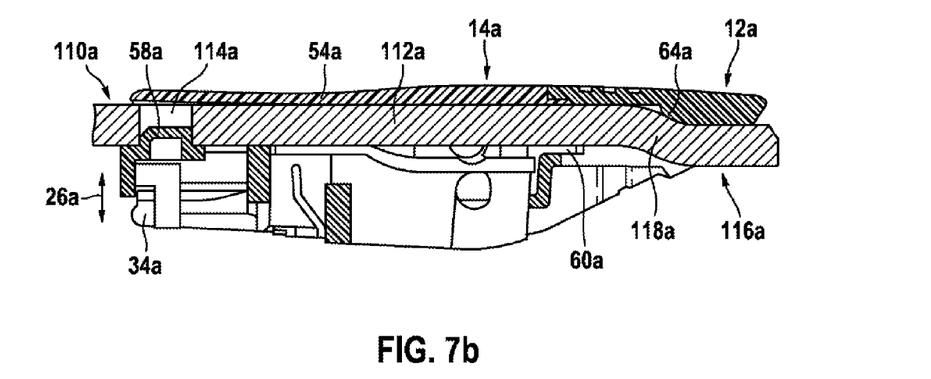

The wiper arm adapter 110a is then pushed into the enclosure means 54a and guided by the longitudinal guide element 60a of the second coupling element 14a (FIG. 7b). The latching means 34a of the second coupling element 14a is deflected in the vertical direction 26a out of the starting position thereof by the basic body 112a. If the wiper arm adapter 110a is pushed entirely into the enclosure means 54a, the latching means 34a springs back into the starting position thereof, engages in a form-fitting manner in the fastening recess 114a and avoids pushing the wiper arm adapter 110a back out of the fitted state. The S-shaped profile 118a bears against a stop 64a of the first coupling element 12a.

FIGS. 8 to 19 show a further exemplary embodiment of the invention. The descriptions below are restricted essentially to the differences between the exemplary embodiments, and, with regard to like components, features and functions, reference can be made to the description of the first exemplary embodiment. In order to differentiate between the exemplary embodiments, the letter a in the reference signs of the exemplary embodiment in FIGS. 1 to 7 has been replaced by the letter b in the reference signs of the exemplary embodiment in FIGS. 8 to 19. With regard to identically designated components, in particular with regard to components with like reference signs, reference can also be made, in principle, to the drawings and/or the description of the first exemplary embodiment.

Figure 8:
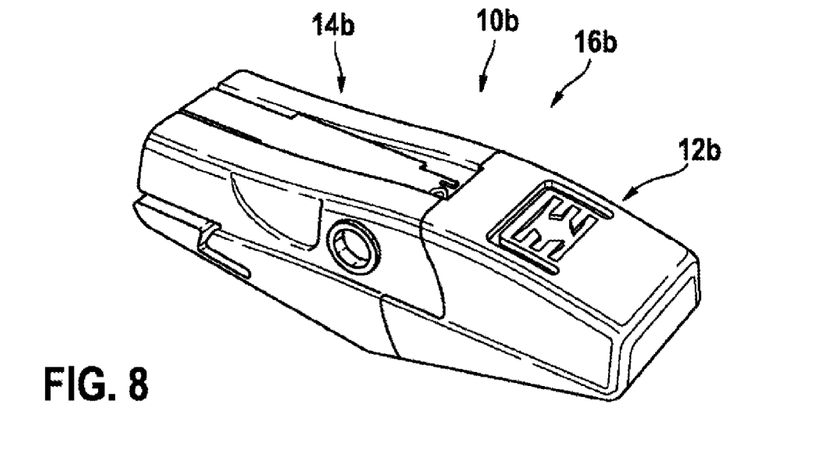
FIG. 8 shows a perspective view of a further exemplary embodiment of a wiper blade adapter.

FIG. 8 shows a further exemplary embodiment of a wiper blade adapter comprising a coupling unit 10b which has a first coupling element 12b and a second coupling element 14b. The first coupling element 12b and the second coupling element 14b are formed by separate components. The coupling elements 12b, 14b are connected in a form-fitting manner.

Figure 9:
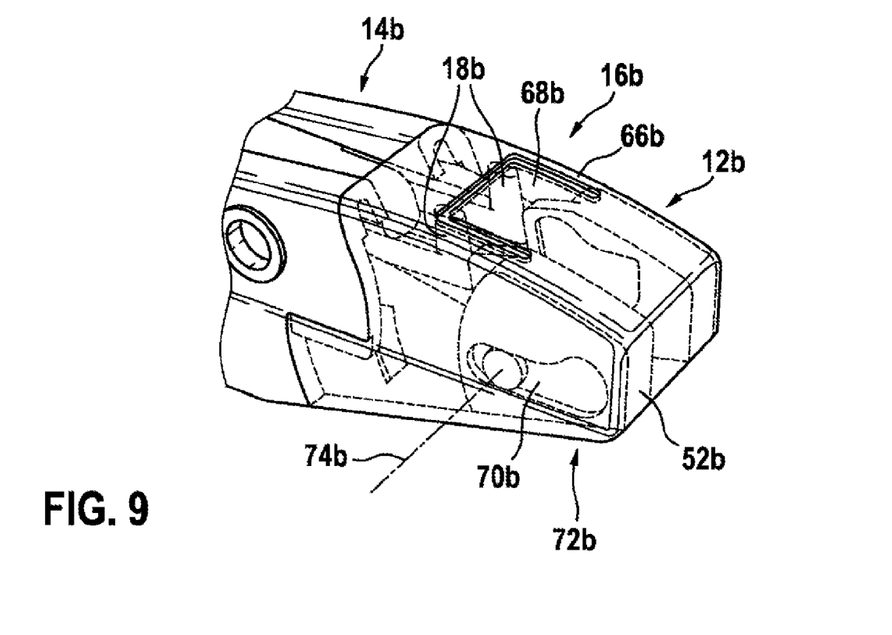
FIG. 9 shows a view of a detail of a first coupling element of the wiper blade adapter according to FIG. 8.

The wiper blade adapter includes a latching unit 16b which is provided to connect the first coupling element 12b to the second coupling element 14b via a latching connection (FIG. 9). For this purpose, the first coupling element 12b comprises two latching means 18b which secure a movably mounted enclosure means 66b. The latching means 18b are deflectable in a spring-elastic manner out of a starting position and, after a deflection, automatically move back into the starting position. The first and second coupling elements are designed so as to be detachable from each other, i.e. non-destructively separable, by means of the enclosure means 66b. In the fitted state shown, the enclosure means 66b forms a form-fitting connection with the second coupling element 14b.

In order to detach the two coupling elements 12b, 14b, an actuating means 68b of the enclosure means 66b, said actuating means being of spring-elastic design, is deflected. The actuating means 68b deflects the latching means 18b and therefore releases the latching connection to the enclosure means 66b. The enclosure means 66b is then guided along a guide rail 70b which is widened in an end region 72b. If the enclosure means 66b bears in the end region 72b of the guide rail 70b, said enclosure means is pivoted about a pivot axis 74b. The enclosure means 66b can be moved in a translational and rotational manner relative to a basic body 52b of the second coupling element 14b. In the process, the enclosure means 66b partially encloses the second coupling element 14b. A covering 22b of the second coupling element 14b is formed in one piece with a basic body 24b of the second coupling element 14b and closes off said basic body in a vertical direction 26b. The vertical direction 26b extends perpendicularly to a longitudinal direction 28b which runs parallel to a main longitudinal extent of the second coupling element 14b.

Figure 10:
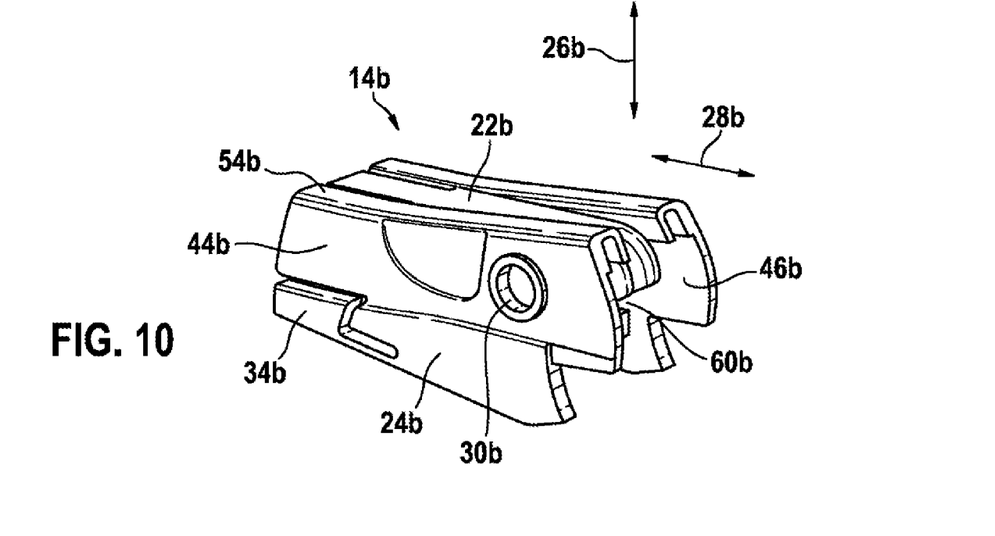
FIG. 10 shows a view of a detail of a second coupling element of the wiper blade adapter according to FIG. 8.
Figure 11:
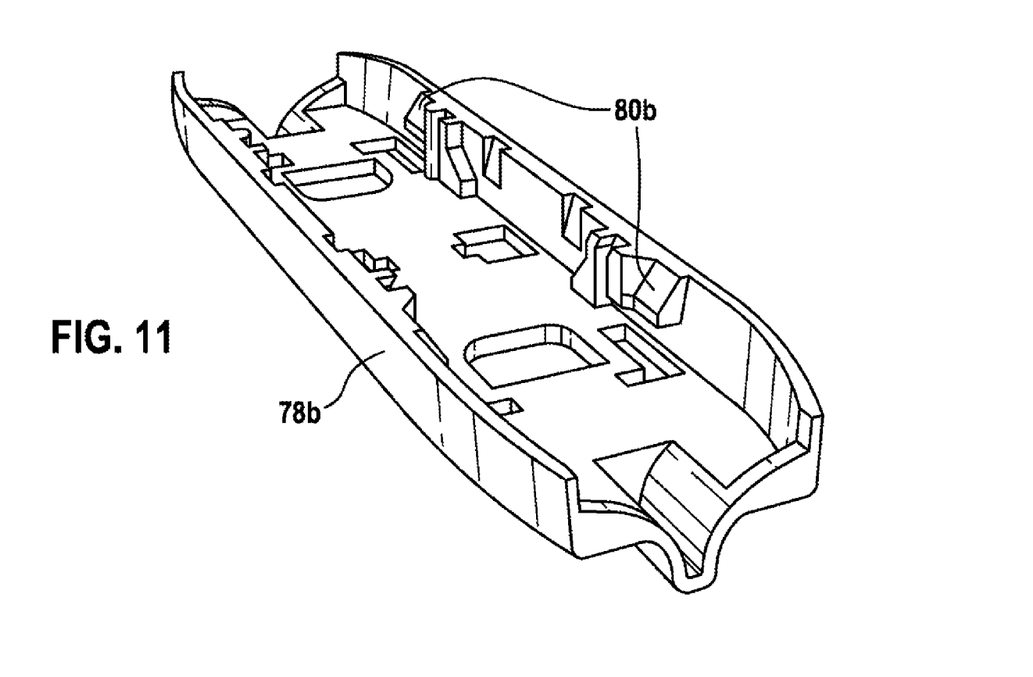
FIG. 11 shows a perspective view of an adapter plate of the wiper blade adapter according to FIG. 8.

The second coupling element 14b has two circular fastening recesses 30b which are arranged in the basic body 24b (FIG. 10). The fastening recesses 30b are provided for a form-fitting connection to a wiper arm adapter.

Furthermore, the second coupling element 14b comprises a latching means 34b which is arranged at a free end of the basic body 24b. Furthermore, the second coupling element 14b has side walls 44b, 46b. The side walls 44b, 46b are formed in one piece with the covering 22b and, together with the latter, form an enclosure means 54b. The enclosure means 54b closes off part of the second coupling element 14b to the outside. In this case, the enclosure means 54b forms a longitudinal guide element 60b of the second coupling element 14b, which longitudinal guide element is provided for guiding a wiper arm during installation.

Figure 12:
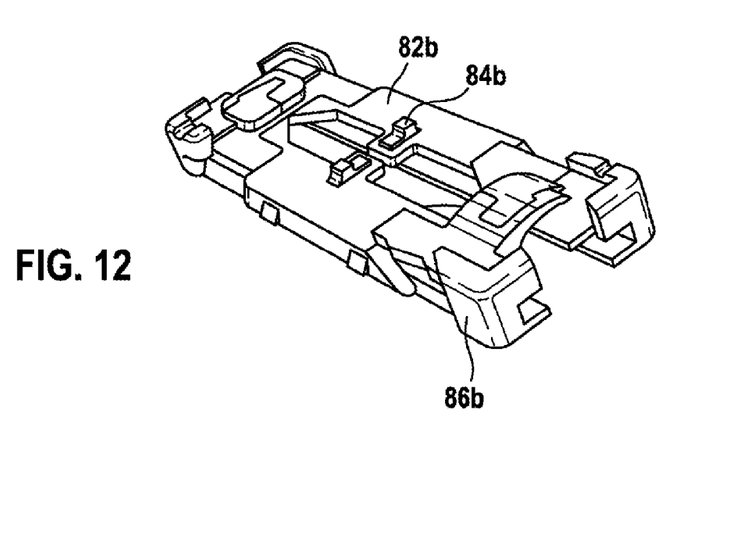
FIG. 12 shows a perspective view of a base adapter of the wiper blade adapter according to FIG. 8.
Figure 13:
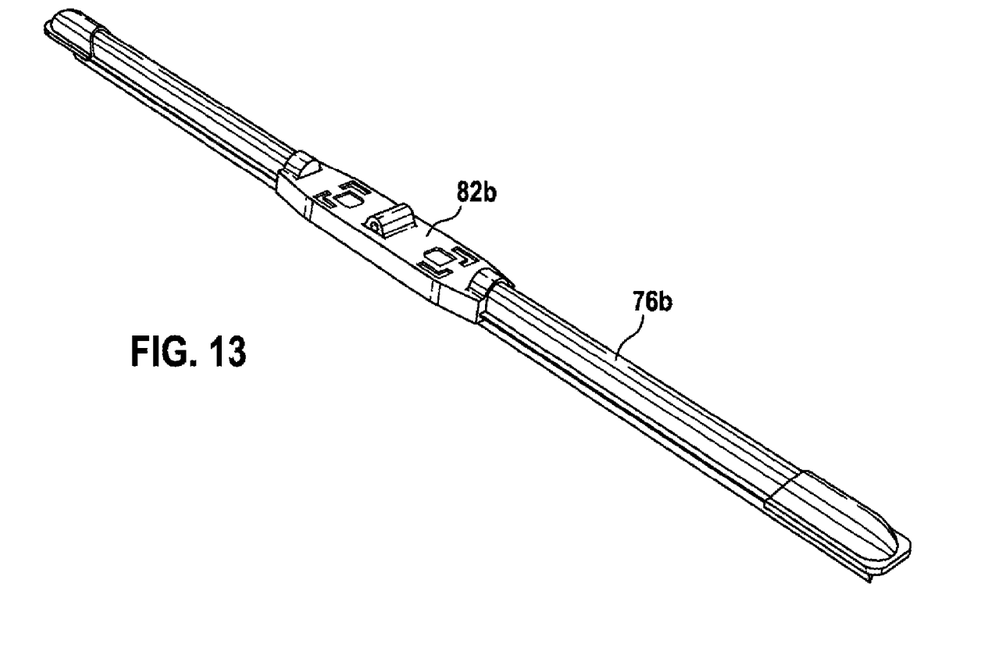
FIG. 13 shows a perspective view of the base adapter according to FIG. 12 and of a wiper blade in a fitted state.

The first and the second coupling elements 12b, 14b are fastenable on an adapter plate 78b via a pin (not illustrated). A lower side of the adapter plate 78b has latching means 80b (FIG. 11) which, in a fitted state, form a form-fitting connection to a base adapter 82b. The base adapter 82b has fastening means 84b which, in a fitted state, form a form-fitting connection to the adapter plate 78b. The latching means 80b here engage in latching recesses 86b of the base adapter 82b (FIG. 12). The base adapter 82b is fastened to a wiper blade 76b via a further component (not illustrated) (FIG. 13).

When the wiper blade adapter is coupled to a wiper arm adapter, the second coupling element 14b has to be removed or placed thereon, depending on a type of the wiper arm adapter. The wiper arm adapter can be coupled to the wiper arm adapters shown in FIGS. 4 and 6 in the same manner as the wiper blade adapter of the first exemplary embodiment.

Figure 14:
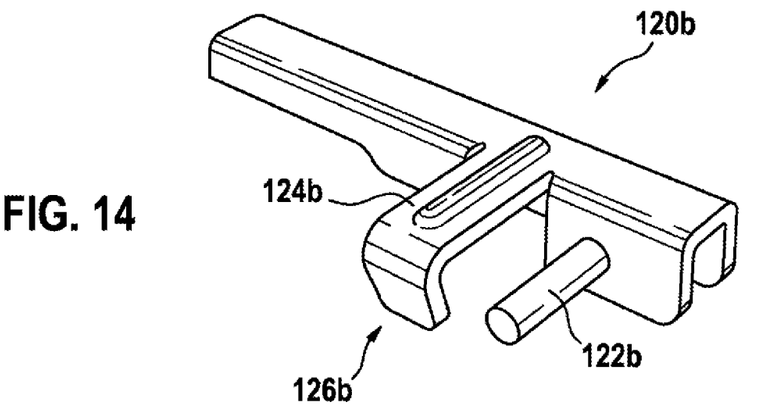
FIG. 14 shows a perspective view of a further type of a wiper arm adapter.

FIG. 14 shows a perspective view of a further type of a wiper arm adapter 120b. The wiper arm adapter 120b has a fastening pin 122b. Furthermore, the wiper arm adapter 120b comprises a supporting plate 124b, the main extent of which first of all extends parallel to the fastening pin 122b. The supporting plate 124b bends away through 90° in an end region 126b.

Figure 15A:
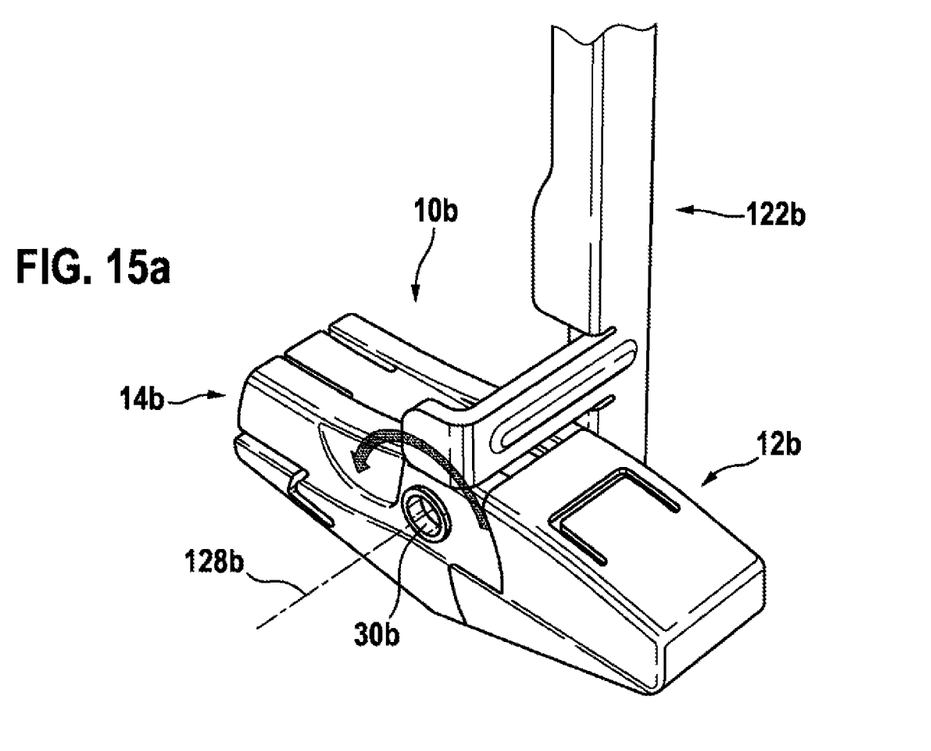
FIGS. 15a and 15b show a perspective view of the wiper blade adapter according to FIG. 8 and of the wiper arm adapter according to FIG. 14 during an installation sequence.
Figure 15B:
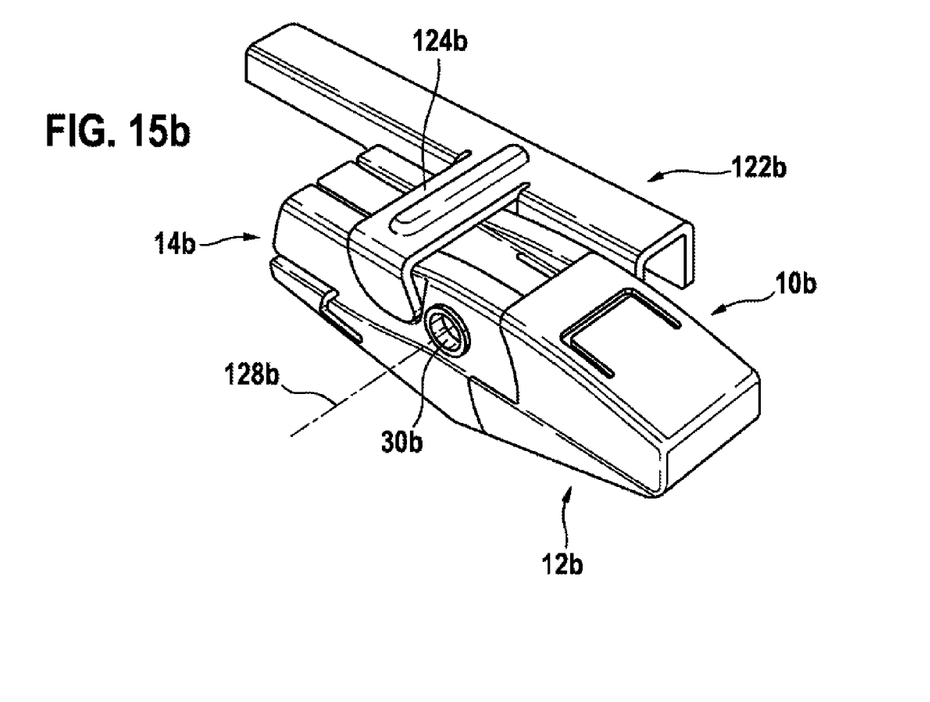

FIG. 15a shows a perspective view of a first installation step of a coupling of the wiper arm adapter 120b to the wiper blade adapter. The fastening pin 122b is pushed into the fastening recesses 30b and forms a form-fitting connection therewith. By rotation of the wiper arm adapter 120b relative to the coupling unit 10b about a pivot axis 128b, part of the supporting plate 124b reaches behind the second coupling element 14b and therefore avoids pushing the wiper arm adapter 120b back (FIG. 15b).

Figure 16:
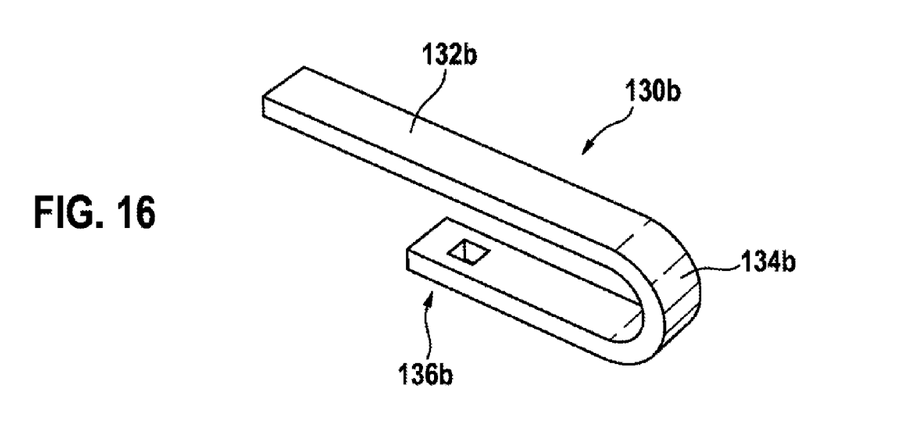
FIG. 16 shows a perspective view of a further type of a wiper arm adapter.

FIG. 16 shows a wiper arm adapter 130b which comprises an elongate basic body 132b. The basic body 132b has a curvature 134b which amounts to 180°.

Figure 17A:
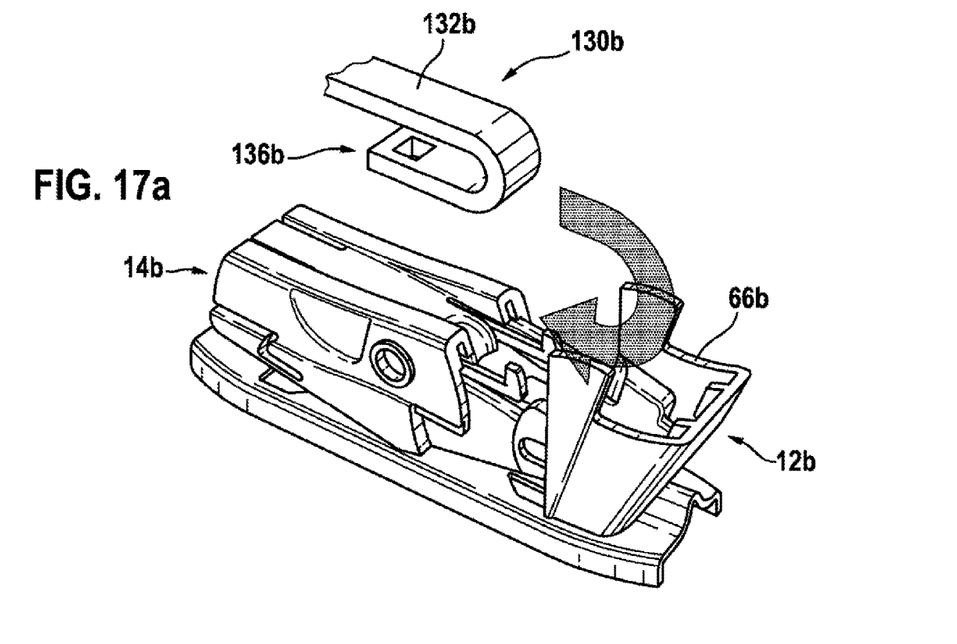
FIGS. 17a and 17b show a perspective view of the wiper blade adapter according to FIG. 8 and of the wiper arm adapter according to FIG. 16 during an installation sequence.
Figure 17B:
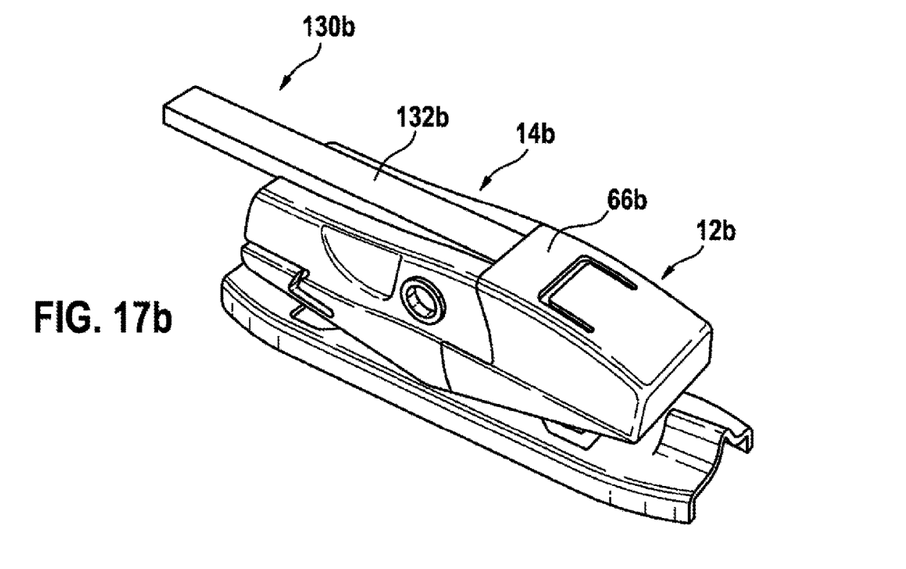

FIG. 17a shows a perspective view of a first installation step of a coupling of the wiper arm adapter 130b to the wiper blade adapter. The enclosure means 66b is in an open state. An end region 136b of the wiper arm adapter 130b is then pushed into the longitudinal guide element 60b of the second coupling element 14b. By guiding back and latching the enclosure means 66b, the wiper arm adapter 130b is securely coupled to the wiper blade adapter.

Figure 18:
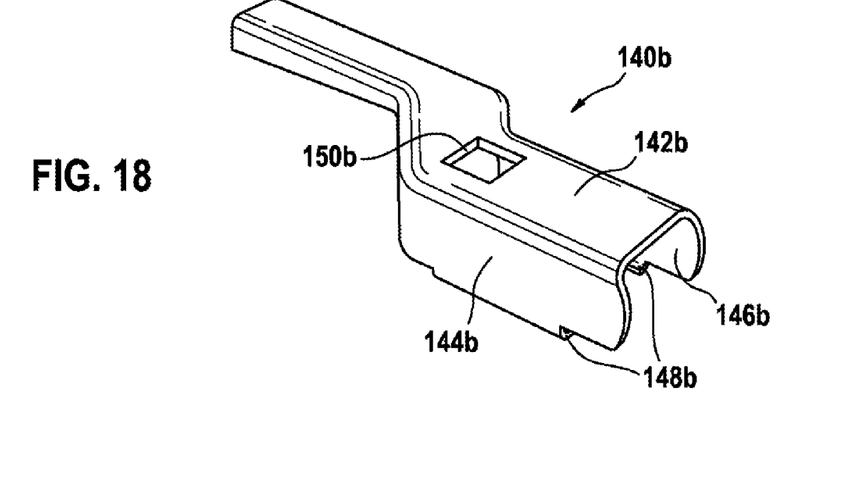
FIG. 18 shows a perspective view of a further type of a wiper arm adapter.

A further type of wiper arm adapter 140b is illustrated perspectively in FIG. 18. The wiper arm adapter 140b has a basic wall 142b on which two side walls 144b, 146b are arranged. The side walls 144b, 146b each enclose an angle of 90° with the basic wall 142b. Fastening means 148b are arranged at a lower end of said side wall 144b, 146b, said fastening means, in turn, enclosing an angle of 90° with respect to the side walls 144b, 146b. A fastening recess 150b is additionally arranged in the basic wall 142b of the wiper arm adapter.

Figure 19A:
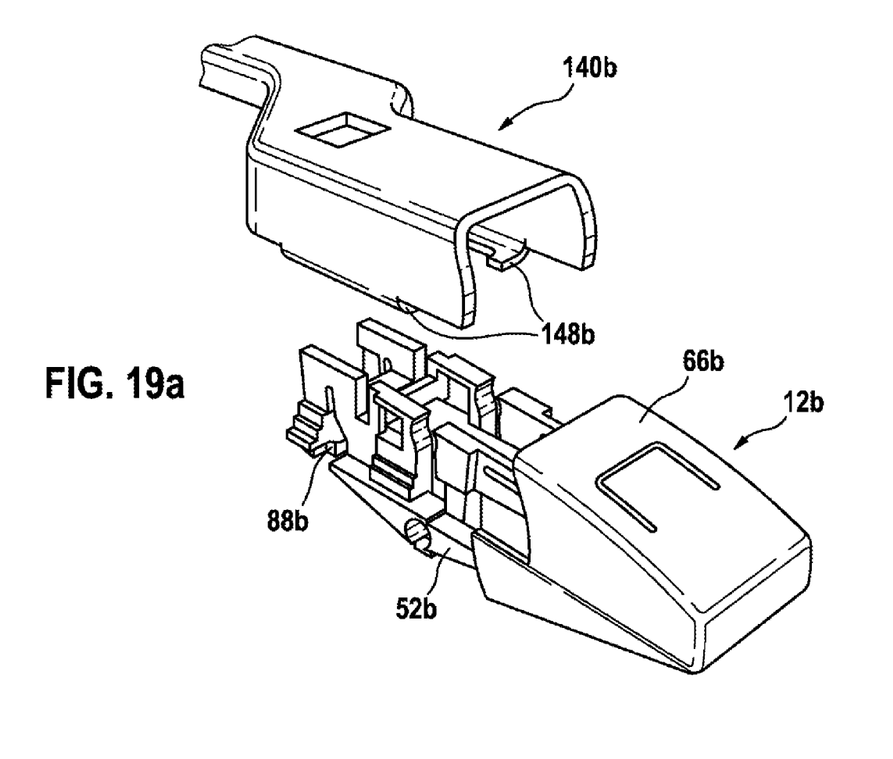
FIGS. 19a and 19b show a perspective view of the wiper blade adapter according to FIG. 8 and of the wiper arm adapter according to FIG. 18 during an installation sequence.

The second coupling element 14b is removed in order to install the wiper arm adapter 140b (FIG. 19a). The enclosure means 66b is displaced in a translational manner relative to the basic body 52b. When the wiper arm adapter 140b is placed onto the first coupling element 12b, a latching means 88b arranged on the basic body 52b is deflected out of a starting position.

Figure 19B:
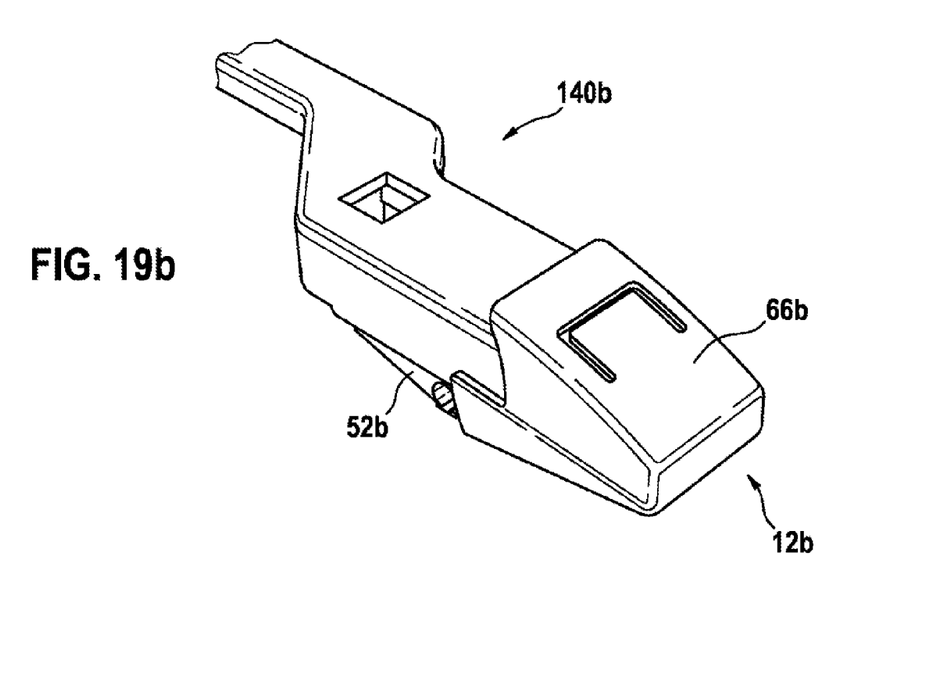

If the wiper arm adapter 140b is placed completely onto the first coupling element 12b, the latching means 88b is moved back into the starting position thereof and then forms a form-fitting connection with the wiper arm adapter 140b which avoids a movement of the wiper arm adapter 140b back out of the fitted state (FIG. 19b).

What is claimed is:

1. A wiper blade adapter, comprising a coupling unit (10a; 10b), characterized in that the coupling unit (10a; 10b) has at least one first and one second coupling element (12a, 14a; 12b, 14b), which are provided for coupling at least two different types of wiper arm adapters (100a, 110a, 120a; 130b, 140b), the wiper blade adapter further including a latching unit (16a; 16b) which is provided to connect the first coupling element (12a; 12b) to the second coupling element (14a; 14b) via a latching connection, an enclosure means (66b) coupled to the first coupling element (12a; 12b) to close off at least part of the first coupling element (12a; 12b), and an actuating means (68b) on the enclosure means (66b) for releasing the first coupling element (12a; 12b) from the second coupling element (14a; 14b).

2. The wiper blade adapter as claimed in claim 1, characterized in that the first and second coupling elements (12a, 14a; 12b, 14b) are formed by separate components.

3. The wiper blade adapter as claimed in claim 1, characterized in that at least one of the coupling elements (12a, 14a; 12b, 14b) has at least one longitudinal guide element (60a; 60b) which is provided for guiding a wiper arm adapter (100a, 110a; 130b) during installation.

4. The wiper blade adapter as claimed in claim 1, characterized in that the second coupling element (14a; 14b) has at least one latching means (34a; 34b) which is provided to limit the freedom of movement of a wiper arm adapter (100a, 110a) in a fitted state.

5. The wiper blade adapter as claimed in claim 1, wherein the enclosure means (66b) which is provided to limit the freedom of movement of a wiper arm adapter (120b, 130b, 140b).

6. The wiper blade adapter as claimed in claim 5, characterized in that the enclosure means (66b) is mounted movably.

7. A system comprising a wiper blade adapter as claimed in claim 1 and at least two wiper arm adapters (100a, 110a, 120a; 130b, 140b).

8. The wiper blade adapter as claimed in claim 1, wherein the actuating means (68b) includes an elastically deflectable, cut-out tongue on the enclosure means (66b).

9. The wiper blade adapter as claimed in claim 1, wherein the enclosure means (66b) is pivotable about a pivot axis (74b).

10. The wiper blade adapter as claimed in claim 1, wherein the enclosure means (66b) is moveable translationally and rotationally relative to a basic body (52b) of the second coupling element (14a; 14b).

11. The wiper blade adapter as claimed in claim 1, wherein the enclosure means (66b) is a first enclosure means, further comprising a second enclosure means (54a; 54b) on the second coupling element (14a; 14b) that closes off at least part of the second coupling element (14a; 14b).

12. The wiper blade adapter as claimed in claim 1, wherein the actuating means (68b) is pressed to release the first coupling element (12a; 12b) from the second coupling element (14a; 14b).

* * * * *